United States Patent
Htay

(10) Patent No.: US 12,542,680 B2
(45) Date of Patent: Feb. 3, 2026

(54) SYSTEMS AND METHODS FOR INVENTORY MODEL SECURITY

(71) Applicant: CIENA CORPORATION, Hanover, MD (US)

(72) Inventor: Aung Htay, Alpharetta, GA (US)

(73) Assignee: CIENA CORPORATION, Hanover, MD (US)

(*) Notice: Subject to any disclaimer, the term of this patent is extended or adjusted under 35 U.S.C. 154(b) by 265 days.

(21) Appl. No.: 18/302,548

(22) Filed: Apr. 18, 2023

(65) Prior Publication Data
US 2024/0356758 A1    Oct. 24, 2024

(51) Int. Cl.
*H04L 9/32*    (2006.01)

(52) U.S. Cl.
CPC ................. *H04L 9/3247* (2013.01)

(58) Field of Classification Search
CPC ... H04W 12/122; H04W 12/50; H04W 12/65; H04W 12/71; H04W 12/76; H04W 68/04; H04W 84/00; H04W 12/065
See application file for complete search history.

(56) References Cited

U.S. PATENT DOCUMENTS

| | | | |
|---|---|---|---|
| 2003/0061487 A1* | 3/2003 | Angelo | G06F 21/6209 713/176 |
| 2024/0163668 A1* | 5/2024 | Bassi | H04W 12/065 |

OTHER PUBLICATIONS

"Products | Inventory—Blue Planet", https://www.blueplanet.com/products/inventory.html, Printed from website on Jan. 17, 2023. 8 Pages.
"What Is Federation?—Blue Planet", https://www.blueplanet.com/resources/What-Is-Federation.html, Printed from website on Apr. 17, 2023, 3 Pages.
"What is Manage, Control and Plan (MCP)?—Ciena", https://www.ciena.com/insights/what-is/What-is-MCP.html, Printed from website on Apr. 17, 2023, 7 Pages.
Lodato, Mark, et al., "A specification for signing methods and formats used by Secure Systems Lab projects", https://github.com/secure-systems-lab/dsse, Jul. 11, 2022, 2 Pages.

* cited by examiner

*Primary Examiner* — Olugbenga O Idowu
(74) *Attorney, Agent, or Firm* — Guntin & Gust, PLC; Kenneth S. Kwan

(57) ABSTRACT

Aspects of the subject disclosure may include, for example, obtaining a first file comprising a first model describing a network; obtaining a second file that is cryptographically signed, the second file comprising a second model describing the network; comparing the first model with the second model, wherein the comparing generates a comparison result; and responsive to the comparison result being that the second model is not identical to the first model, outputting a notification. Other embodiments are disclosed.

20 Claims, 12 Drawing Sheets

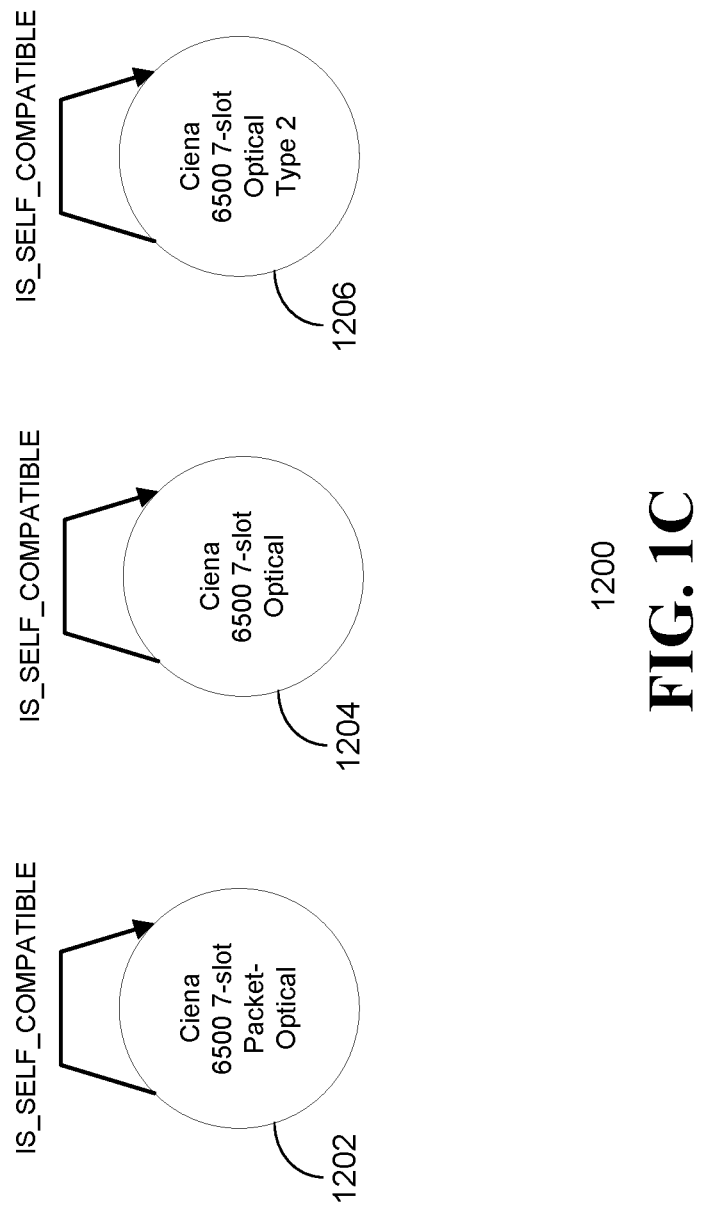

SYSTEMS AND METHODS FOR INVENTORY MODEL SECURITY

FIELD OF THE DISCLOSURE

The subject disclosure relates to systems and methods for inventory model security.

BACKGROUND

Today's networks are increasingly complex. Inventory systems are a critical component of a network provider's operations. The threat to these systems is real and growing. As that trend continues, having traceability as a requirement is becoming common.

The BLUE PLANET Inventory (see, e.g., https://www.blueplanet.com/products/inventory.html) uses federation technology to unify inventory data from multiple existing Operational Support Systems (OSS), Network Management Systems (NMS), and other sources to create a single "source of truth" for network and IT users that reflects the current state of the network. While the inventories from the underlying network (physical and logical) are "ingested" into the graph database, the inventories are not typically verifiably derived from the metadata model.

BRIEF DESCRIPTION OF THE DRAWINGS

Reference will now be made to the accompanying drawings, which are not necessarily drawn to scale, and wherein:

FIG. 1C is a block diagram illustrating an example, non-limiting embodiment of various archetypes that can be generated and/or operated upon in the context of the system of FIG. 1A in accordance with various aspects described herein.

DETAILED DESCRIPTION

Figure 1A:
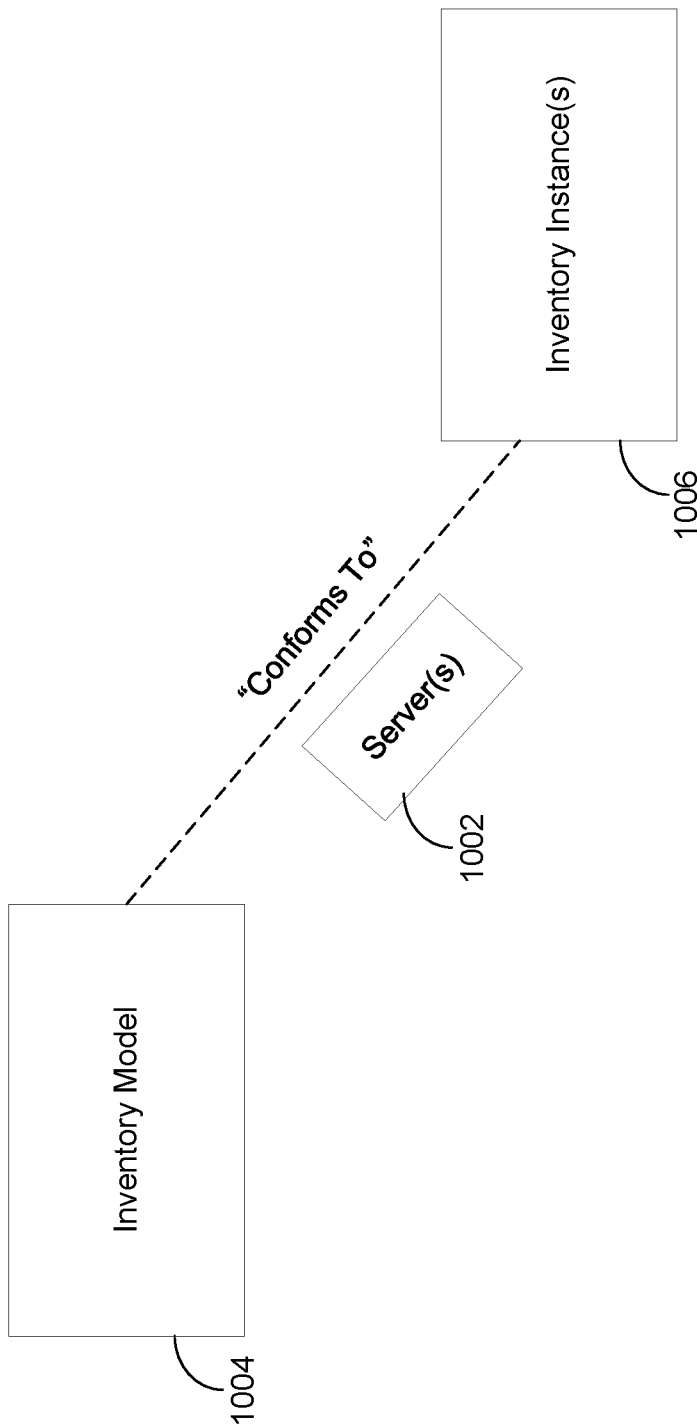
FIG. 1A is a block diagram illustrating an example, non-limiting embodiment of a system functioning in accordance with various aspects described herein.

Various embodiments can operate to safeguard one or more inventory models. In one example, an inventory model that is safeguarded can be an inventory metadata model (or metamodel). In one specific example, the inventory model that is safeguarded can be a BLUE PLANET inventory metadata model. Various embodiments can prevent (or reduce) tampering, improve integrity, and facilitate tracing a particular inventory model instance back to a corresponding inventory metadata model. Various embodiments can facilitate verifying that each inventory model instance is produced according to the corresponding inventory metadata model and that each inventory model instance still conforms to the corresponding inventory metadata model by audit (wherein such audit can be carried out, for example, periodically and/or on-demand). The authenticity and integrity (e.g., using digital signature) of this verification can be available as a provenance (e.g., to one or more customers, to one or more network operators, and/or to one or more other interested parties).

One or more aspects of the subject disclosure include a non-transitory machine-readable medium comprising executable instructions that, when executed by a processing system including a processor, facilitate performance of operations, the operations comprising: obtaining a first file comprising a first model describing a network; obtaining a second file that is cryptographically signed, the second file comprising a second model describing the network; comparing the first model with the second model, wherein the comparing generates a comparison result; and responsive to the comparison result being that the second model is not identical to the first model, outputting a notification.

One or more aspects of the subject disclosure include a device, comprising: a processing system including a processor; and a memory that stores executable instructions that, when executed by the processing system, facilitate performance of operations, the operations comprising: determining whether a file that is cryptographically signed and which contains a first instance of a metadata model describing a network has been modified subsequent to the file having been cryptographically signed, wherein the determining results in a determination; responsive to the determination being that the file has not been modified subsequent to the file having been cryptographically signed, comparing the first instance of the metadata model with a second instance of the metadata model, wherein the comparing generates a comparison result; and responsive to the comparison result being that the first instance of the metadata model is not identical to the second instance of the metadata model, outputting a warning.

One or more aspects of the subject disclosure include a method, comprising: generating, by a processing system including a processor, a metadata model describing a network; generating, by the processing system, a cryptographically signed file comprising the metadata model; transmitting, by the processing system, the metadata model to a first database containing a plurality of metadata models; transmitting, by the processing system, the cryptographically signed file to a second database containing a plurality of cryptographically signed files; subsequent to the transmitting of the metadata model and the transmitting of the cryptographically signed file, comparing, by the processing system, the metadata model that is located on the first database to the metadata model of the cryptographically signed file that is on the second database; responsive to the comparing indicating that the metadata model that is located on the first database is not identical to the metadata model of the cryptographically signed file that is on the second database, generating, by the processing system, a warning; and responsive to the generating of the warning, outputting, by the processing system, the warning to one or more users.

Referring now to FIG. 1A, this is a block diagram illustrating an example, non-limiting embodiment of a system 1000 functioning in accordance with various aspects described herein. As seen in this figure, one or more server(s) 1002 can operate to provide modeling, verification, auditing, and the like as described herein. For example, server(s) 1002 can operate to verify that each of inventory instance(s) 1006 "conforms to" a respective inventory model 1004. In one example, inventory model 1004 that is safeguarded can be an inventory metadata model (wherein each of inventory instance(s) 1006 corresponds to such an inventory metadata model). In one specific example, the inventory model 1004 that is safeguarded can be a BLUE PLANET inventory metadata model (wherein each of inventory instance(s) 1006 is a corresponding BLUE PLANET instance). In one embodiment, the inventory model 1004 can be implemented as a graph model. In one specific example, the inventory model can start with a highest level of abstractions and can be progressively refined as shown below in Table 1:

TABLE 1

| COMPONENTS | DESCRIPTION |
| --- | --- |
| Hypermodel | This defines the highest level of nodes and edges (relationships). It provides a framework for the Metamodel. Example Hypermodel is "Equipment". |
| Metamodel | This is the next level of refinement for the Hypermodel. It defines typical "objects" used in an inventory solution modeling. Example Metamodel are "Device", "Rack", "Card" which are several kinds of "Equipment". |
| Archetype | This defines the "types" of "objects" of the Metamodel. For example, in the "Device" above, we can model a "Ciena 6500 7-Slot Optical Type 2". |
| Archetype Instance | Archetype instances are pre-defined composition of archetypes that can be copied into inventory instances. |

Figure 1B:
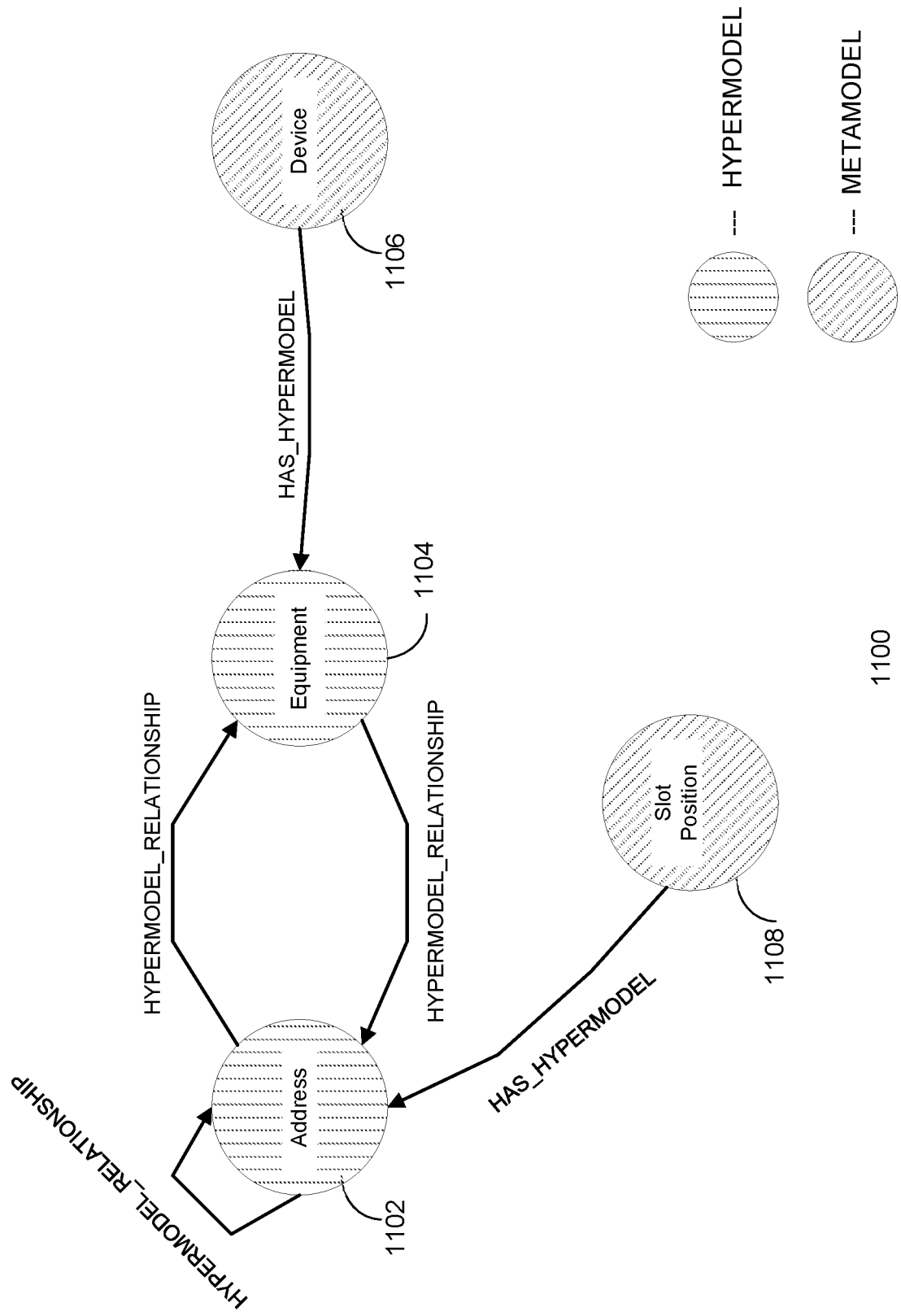
FIG. 1B is a block diagram illustrating an example, non-limiting embodiment of various models that can be generated and/or operated upon in the context of the system of FIG. 1A in accordance with various aspects described herein.

Referring now to FIG. 1B, this is a block diagram illustrating an example, non-limiting embodiment of various models that can be generated and/or operated upon in the context of the system of FIG. 1A in accordance with various aspects described herein. In this example, two Hypermodels 1102, 1104 are shown (see the circles with the vertical line hatching) and two Metamodels 1106, 1108 are shown (see the circles with the angled line hatching).

Referring now to FIG. 1C, this is a block diagram illustrating an example, non-limiting embodiment of various archetypes that can be generated and/or operated upon in the context of the system of FIG. 1A in accordance with various aspects described herein. In this example, three Archetypes 1202, 1204, 1206 are shown.

Figure 1D:
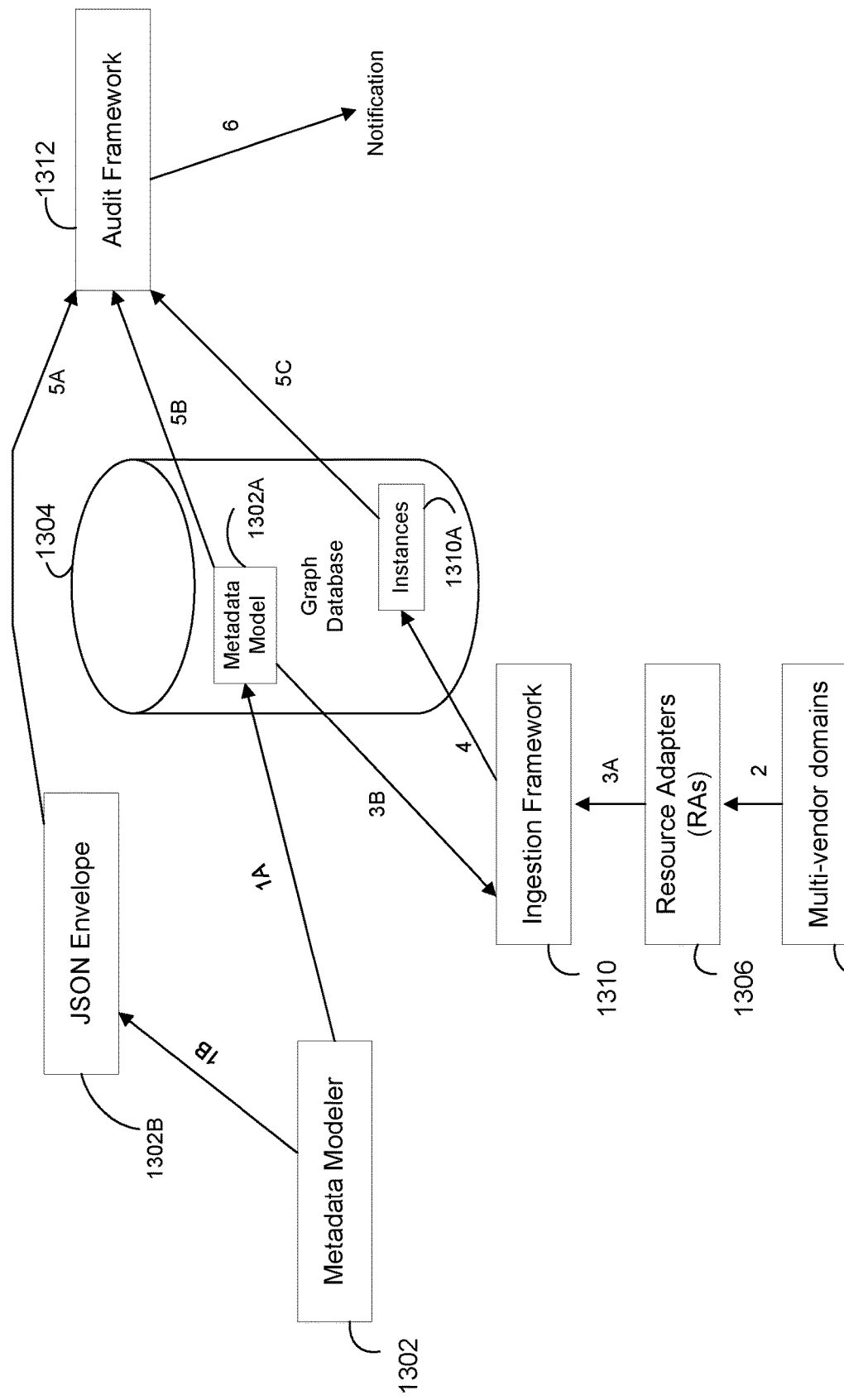
FIG. 1D is a block diagram illustrating an example, non-limiting embodiment of a system (and process flow) functioning in accordance with various aspects described herein.

Referring now to FIG. 1D, this is a block diagram illustrating an example, non-limiting embodiment of a system 1300 (and process flow) functioning in accordance with various aspects described herein. As seen in this figure, system 1300 includes metadata modeler 1302, graph database 1304, audit framework 1312, ingestion framework 1310, resource adapters (RAs) 1306, and multi-vendor domains 1308.

Still referring to FIG. 1D, various steps of an operation process that can be carried out by system 1300 according to an embodiment are as follows:

A. Metadata Modeling—Metadata modeler 1302 is used to model a network element (e.g., a Ciena 6500 device—see FIG. 1F for an example) and persists the metadata model in graph database 1304 (see arrow "1A" and metadata model 1302A). Then, the metadata content is cryptographically (sometimes referred to herein as digitally) signed (as described in more detail below) using a private key and stored as JSON Envelope 1302B (see arrow "1B"). In various examples, the metadata modeler 1302 can utilize a graphical user interface (GUI), an application programming interface (API), or any combination thereof.

B. Inventory Discovery—Resource Adapters (RAs) 1306 are developed and deployed to interface with the multi-vendor domains (devices) 1308 and retrieve the inventory data (see arrow "2").

C. Inventory Data Transformation—Inventory data collected by RAs 1306 is sent to the ingestion framework 1310 (see arrow "3A"). Using metadata model 1302A (see arrow "3B"), the ingestion framework 1310 makes the multi-vendor instance data "conform" to the metadata model 1302A. In one specific example, when a NTK503KA device and NTK538UJ card (in slot 1) are discovered, the ingestion framework 1310 uses the archetype instance (see FIG. 1F for an example) to "stamp" out the predefined instances and add relevant relationships (see FIG. 1G for an example).

D. Inventory Data Persistence—Ingestion framework 1310 persists instance data 1310A in the graph database (see arrow "4").

E. Audit—Periodic and/or on-demand audit is supported. The audit framework 1312 first verifies the signature (as discussed in more detail below) from the content of the JSON Envelope 1302B (see arrow "5A"). The payload from the JSON Envelope 1302B is audited against the metadata model 1302A in the graph database 1304 (see arrow "5B"). Once the metadata model 1302A is verified, the instance data 1310A is audited with respect to the metadata model 1302A (see arrow "5C").

F. Reporting—If any verification at steps 5A, 5B, 5C fails, then a notification is generated (see arrow 6). In various examples, the notification can be transmitted to one or more users, one or more system administrators, one or more operators, one or more engineers, one or more technicians, or the like. In various examples, the notification can be transmitted via email, SMS (text), phone call, or the like.

Figure 1E:
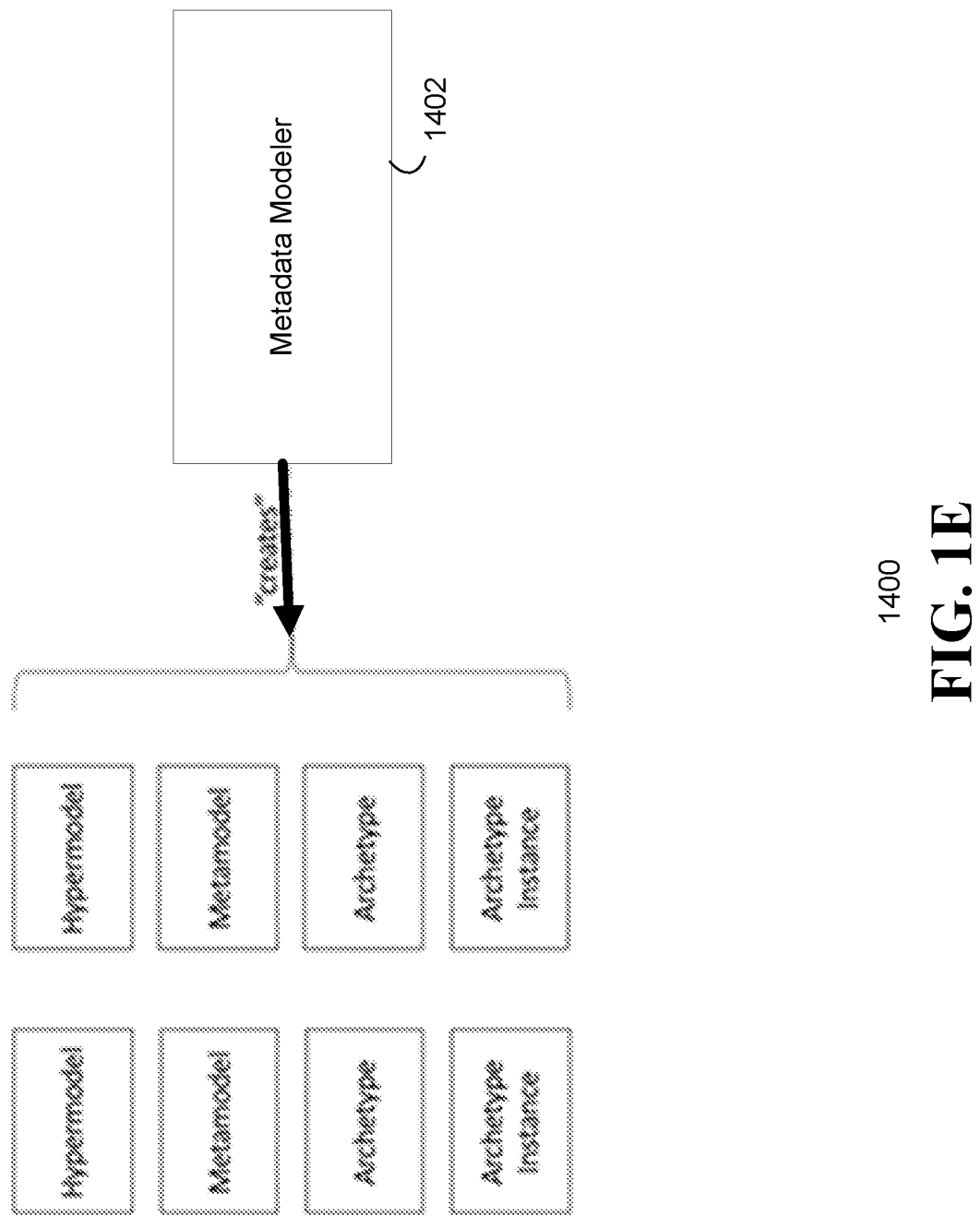
FIG. 1E is a block diagram illustrating an example, non-limiting embodiment of various models that can be generated and/or operated upon in the context of the system of FIG. 1D in accordance with various aspects described herein.

Referring now to FIG. 1E, this is a block diagram illustrating an example, non-limiting embodiment of various models that can be generated and/or operated upon in the context of the system of FIG. 1D in accordance with various aspects described herein. As seen in this figure, metadata modeler 1402 (which can be similar to metadata modeler 1302 of FIG. 1D) can create various models and/or instances. In various embodiments, the modeling can be applied to physical inventory modeling, logical inventory modeling, or a combination thereof. In one specific example, metadata modeler 1402 can be used within BLUE PLANET Inventory (BPI) to create and deploy equipment models.

Figure 1F:
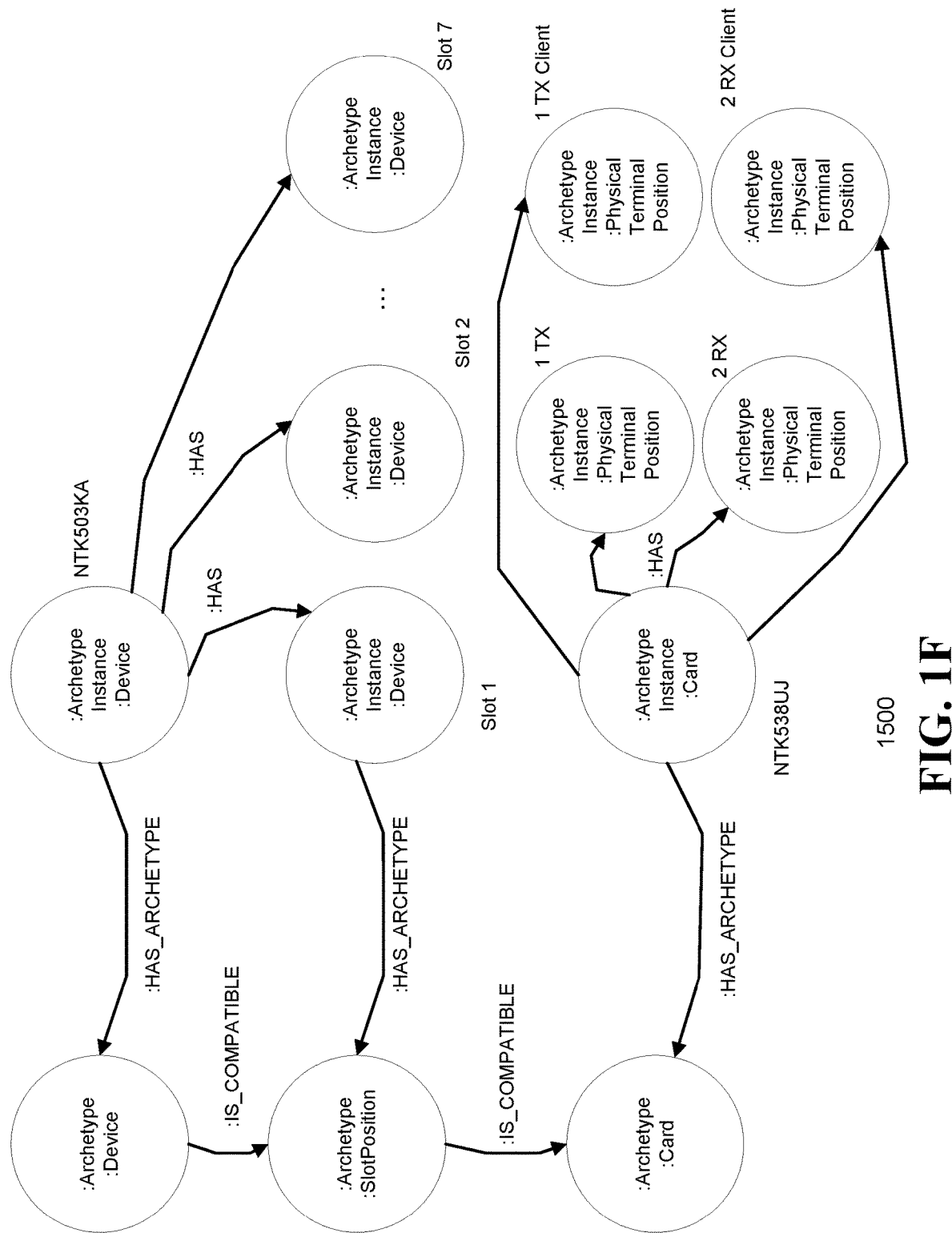
FIG. 1F is a block diagram illustrating an example, non-limiting embodiment of various archetype and archetype instances that can be generated and/or operated upon in the context of the system of FIG. 1D in accordance with various aspects described herein.

Referring now to FIG. 1F, this is a block diagram illustrating an example, non-limiting embodiment of various archetype and archetype instance 1500 that can be generated and/or operated upon in the context of the system of FIG. 1D in accordance with various aspects described herein. In this example, a modeling is directed to a "device" (in this case, a Ciena 6500 7 Slot Optical Type 2, which has one "shelf"; this shelf has seven "slot positions" (slot 1, slot 2, . . . slot 7). These slot positions can contain compatible "cards".

Figure 1G:
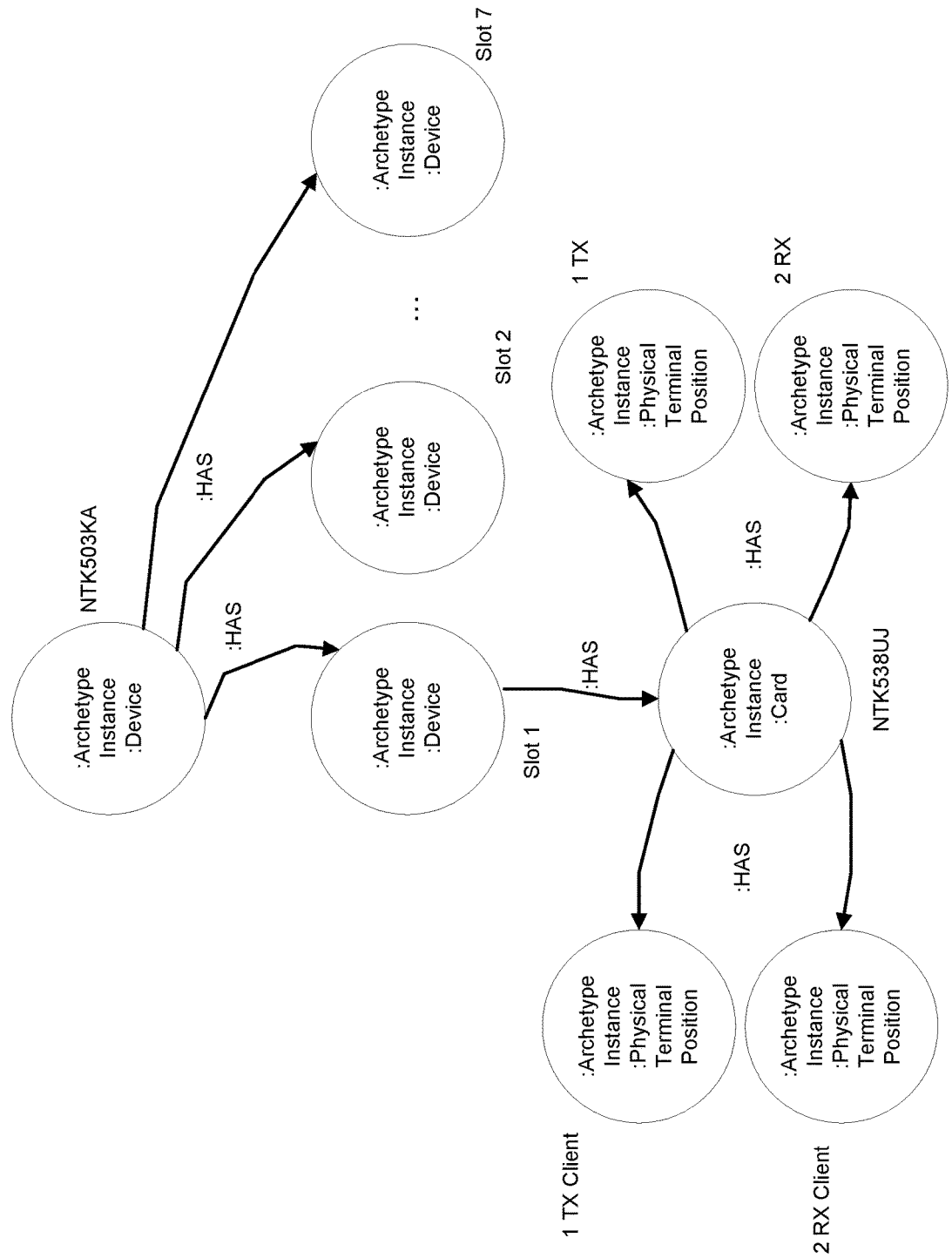
FIG. 1G is a block diagram illustrating an example, non-limiting embodiment of various inventory instances that can be generated and/or operated upon in the context of the system of FIG. 1D in accordance with various aspects described herein.

Referring now to FIG. 1G, this is a block diagram illustrating an example, non-limiting embodiment of various inventory instances 1600 that can be generated and/or operated upon in the context of the system of FIG. 1D in accordance with various aspects described herein.

Reference will now be made to an example cryptographically signing of a model (see, e.g., FIG. 1D, step 1B) according to an embodiment. Of note, this example is based upon the "Dead Simple Signing Envelope (DSSE)"—see https://github.com/secure-systems-lab/dsse. More particularly, this cryptographically (digital) signing example operates as follows:
  A. First, define a PAYLOAD_TYPE using Uniform Resource Identifier (URI), "https://www.blueplanet.com/bpi/metamodel-json". Note that this URI should be human readable but may be unresolvable.
  B. Next, the model is cryptographically signed using the DSSE protocol (see https://github.com/secure-systems-lab/dsse/blob/master/protocol.md), where the serialized_body is the JSON representation of the inventory metadata model (see, e.g., Table 2 below).
  C. The "signed" model is then stored in a standard data structure of the following form, called the "JSON envelope":

```
{
  "payload": "<Base64(SERIALIZED_BODY)>",
  "payloadType": "https://www.blueplanet.com/bpi/metamodel-json",
  "signatures": [{
      "keyid": "<KEYID_1>",
      "sig": "<SIG_1>"
  }, {
      "keyid": "<KEYID_2>",
      "sig": "<SIG_2>"
  }]
}
```
NOTE:
Base64( ) is Base64 encoding, transforming a byte sequence to a Unicode string.
keyid is optional. Multi-signature enhances the security by allowing multiple signers to sign the same payload.

Reference will now be made to an example verifying and auditing of a model (see, e.g., FIG. 1D, steps 5A, 5B, 5C) according to an embodiment. More particularly, this verifying and auditing example operates as follows:
  A. From the stored JSON envelope (see, e.g., FIG. 1D, element 1302B) get the following parts: SERIALIZED_BODY, payloadType, sig, and optional keyid.
  B. Optional KEYID can be used to filter acceptable public keys.
  C. Verify that the sig against PAE (UTF8 (PAYLOAD_TYPE), SERIALIZED_BODY). Reject if the verification fails.
  D. Reject if payloadType is not "https://www.blueplanet.com/bpi/metamodel-json".
  E. Parse SERIALIZED_BODY according to payloadType_TYPE. Reject if the parsing fails.
  F. A result is now the "verified" inventory model. Audit the graph model (see, e.g., FIG. 1D, element 1302A) against this "verified" model.

Reference will now be made to an example model represented programmatically as a JSON file. Such a JSON file can describe various elements, such as "Equipment," "Address," "Interface," "Connection," "Abstraction," "Plan," "Activity," "Generic". The following example JSON record shows "Equipment" in Table 2:

TABLE 2

```
{
  "h": {
    "identity": 356,
    "labels": [
      "Hypermodel",
      "Model"
    ],
    "properties": {
      "metadataPurpose": true,
      "createdDate": 1653031883161,
      "xHypermodelId": 100007,
      "hypermodelId": 1,
      "lastModifiedDate": 1581068498906,
      "name": "Equipment",
      "p1Latest": true,
      "drniId": 1,
      "BPIUId": "bpi.standard.v1.1",
      "latest": [
        1
      ]
    }
  }
}
```

As described herein, various embodiments can prevent (or reduce) inventory tampering by digitally signing each inventory metadata model of the inventories in a network (in one example, the digital signing of each model can comprise multiple signatures being supported). When one or more inventories are "discovered" from a network, such one or more inventories can be checked against the metadata model. Periodically (and/or on-demand), each metadata model signature can be verified. Each multi-vendor inventory can be verified using multiple signatures. Multi-domains, multi-layers service "relationships" can be verified to ensure that they comply to the "relationship"" as defined in the corresponding metadata model.

As described herein, various embodiments can provide for safeguarding inventory authenticity and/or integrity across a supply chain (e.g., for the BLUE PLANET Inventory product).

Figure 2A:
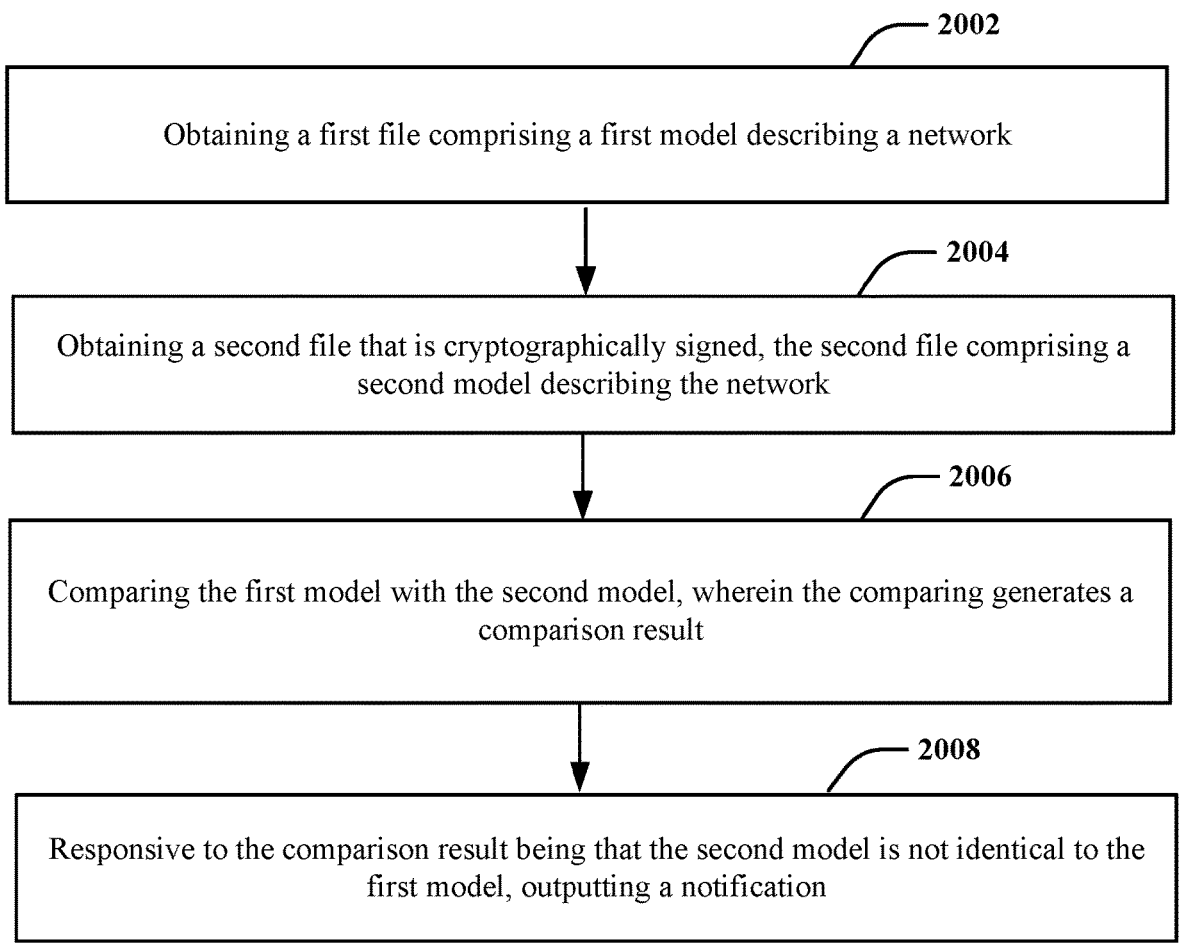
FIG. 2A depicts an illustrative embodiment of a method in accordance with various aspects described herein.

Referring now to FIG. 2A, various steps of a method 2000 according to an embodiment are shown. As seen in this FIG. 2A, step 2002 comprises obtaining a first file comprising a first model describing a network. Next, step 2004 comprises obtaining a second file that is cryptographically signed, the second file comprising a second model describing the network. Next, step 2006 comprises comparing the first model with the second model, wherein the comparing generates a comparison result. Next, step 2008 comprises responsive to the comparison result being that the second model is not identical to the first model, outputting a notification.

While for purposes of simplicity of explanation, the respective processes are shown and described as a series of blocks in FIG. 2A, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. Further, some portions of embodiments can be combined with portions of other embodiments.

Figure 2B:
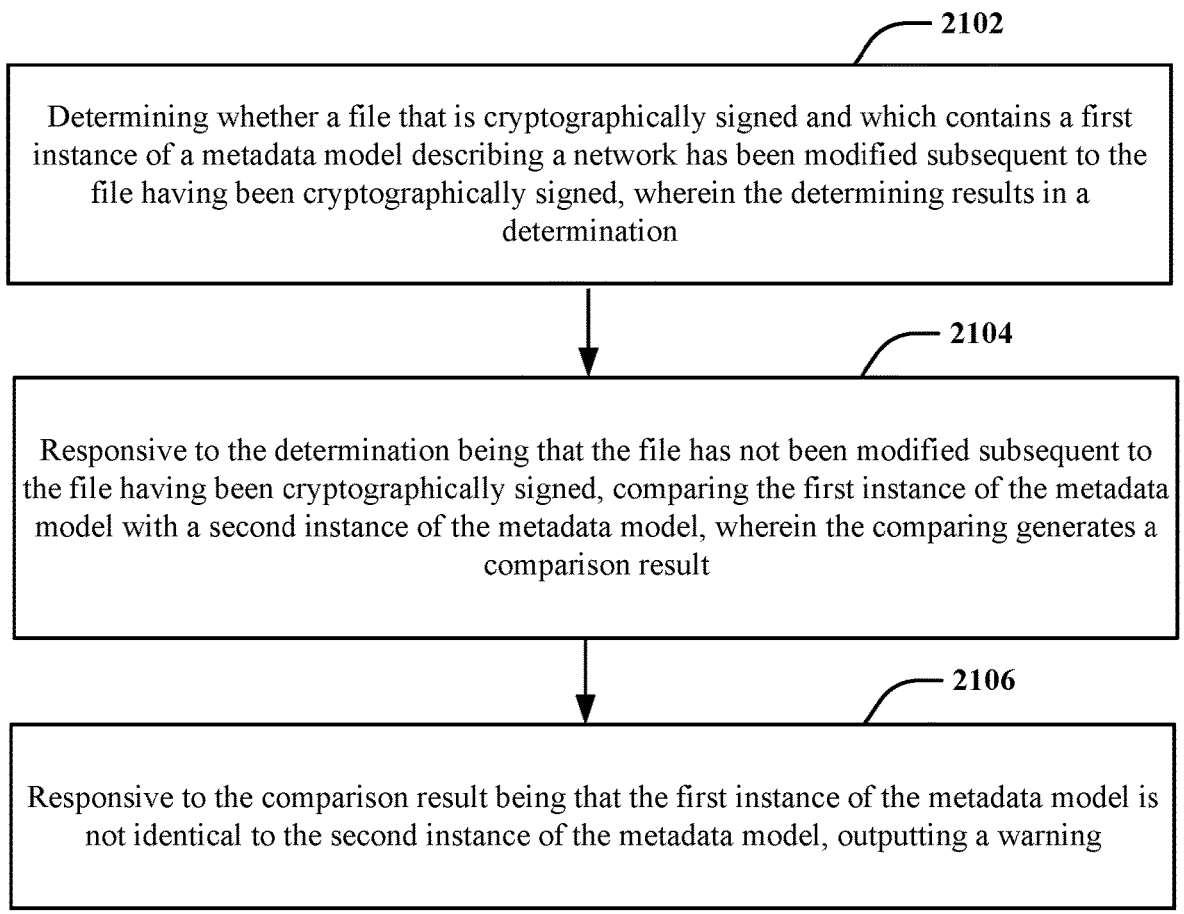
FIG. 2B depicts an illustrative embodiment of a method in accordance with various aspects described herein.

Referring now to FIG. 2B, various steps of a method 2100 according to an embodiment are shown. As seen in this FIG. 2B, step 2102 comprises determining whether a file that is cryptographically signed and which contains a first instance of a metadata model describing a network has been modified subsequent to the file having been cryptographically signed, wherein the determining results in a determination. Next, step 2104 comprises responsive to the determination being that the file has not been modified subsequent to the file having been cryptographically signed, comparing the first instance of the metadata model with a second instance of the metadata model, wherein the comparing generates a comparison result. Next, step 2106 comprises responsive to the comparison result being that the first instance of the metadata model is not identical to the second instance of the metadata model, outputting a warning. In one specific embodiment, the comparison result being that the first instance of the metadata model is not identical to the second instance of the metadata model can mean that the second instance of the metadata model has been changed such that it is no longer identical to the first instance of the metadata model that is contained within the file that is cryptographically signed.

While for purposes of simplicity of explanation, the respective processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. Further, some portions of embodiments can be combined with portions of other embodiments.

As described herein, various embodiments can provide notification of tampering (e.g., tampering of an inventory model stored on a database). In one specific example, notification of tampering (of a model) directed to change of a network card (and/or other network element) can be provided. In one specific example, notification of tampering (of a model) directed to change of a network relationship can be provided.

As described herein, various embodiments can provide for detection of a change in a stored inventory model (see, e.g., steps 5A, 5B of FIG. 1D). Further, after such detection, a determination of a specific instance change can be made (see, e.g., step 5C of FIG. 1D).

As described herein, various embodiments can provide notification of tampering (or hacking) to determine that an inventory model has received unauthorized changes such as to facilitate use of an unauthorized network component, facilitate use of a less expensive network component, and/or a facilitate use of a network component manufactured by a different manufacturer.

As described herein, various embodiments can provide, responsive to detection of tampering (or hacking), feedback to facilitate mitigation. Such mitigation can comprise, for example, shutting off a particular network device.

As described herein, verification can be carried out on-demand and/or periodically (e.g., every 5 minutes, every 10 minutes, every hour, one a day, once a week, etc.).

As described herein, various embodiments can operate in the context of a public key/private key infrastructure (e.g., wherein one digital key is given away and another digital key is kept private).

Figure 2C:
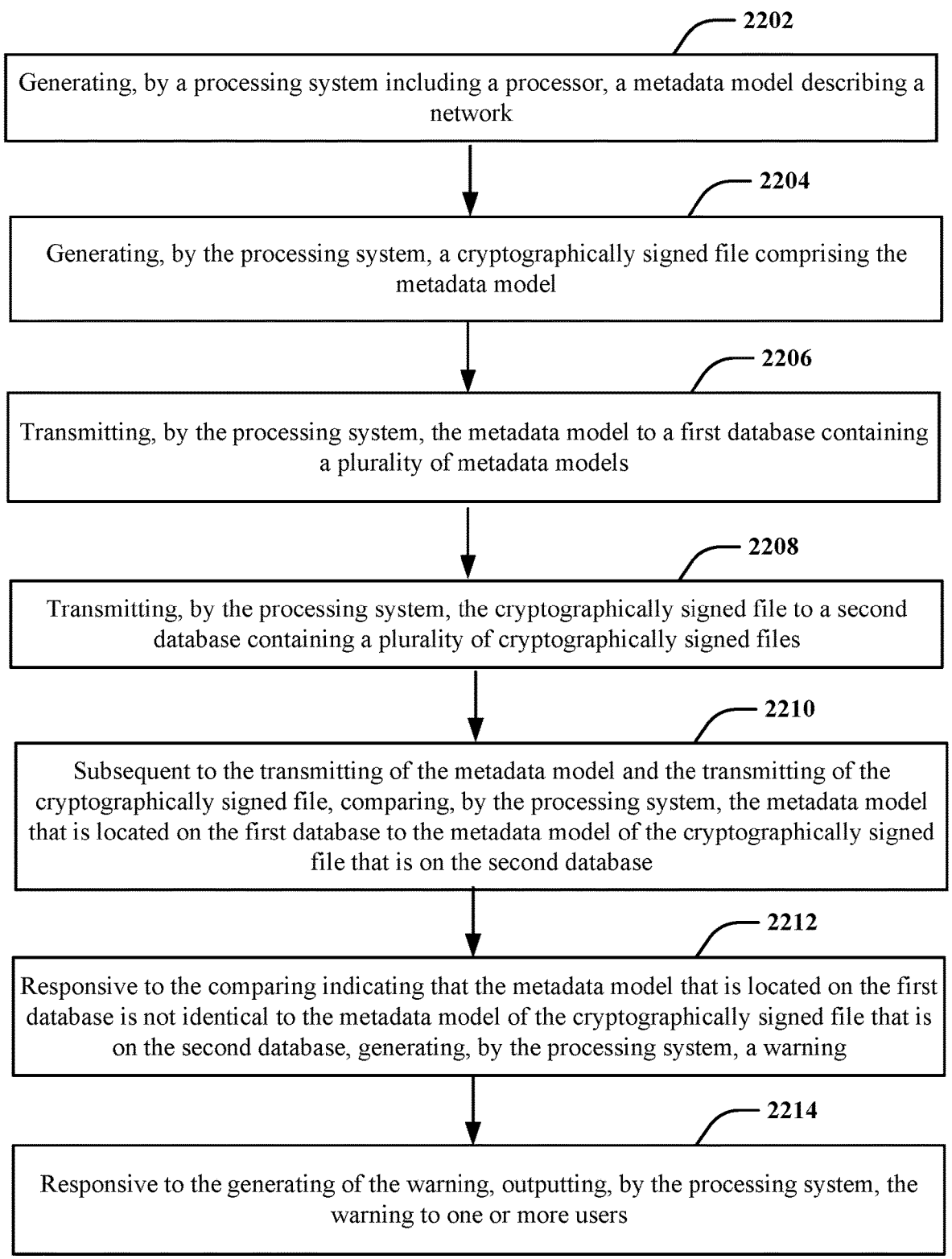
FIG. 2C depicts an illustrative embodiment of a method in accordance with various aspects described herein.

Referring now to FIG. 2C, various steps of a method 2200 according to an embodiment are shown. As seen in this FIG. 2C, step 2202 comprises generating, by a processing system including a processor, a metadata model describing a network. Next, step 2204 comprises generating, by the processing system, a cryptographically signed file comprising the metadata model. Next, step 2206 comprises transmitting, by the processing system, the metadata model to a first database containing a plurality of metadata models. Next, step 2208 comprises transmitting, by the processing system, the cryptographically signed file to a second database containing a plurality of cryptographically signed files. Next, step 2210 comprises subsequent to the transmitting of the metadata model and the transmitting of the cryptographically signed file, comparing, by the processing system, the metadata model that is located on the first database to the metadata model of the cryptographically signed file that is on the second database. Next, step 2212 comprises responsive to the comparing indicating that the metadata model that is located on the first database is not identical to the metadata model of the cryptographically signed file that is on the second database, generating, by the processing system, a warning. Next, step 2214 comprises responsive to the generating of the warning, outputting, by the processing system, the warning to one or more users.

While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. Further, some portions of embodiments can be combined with portions of other embodiments.

Figure 3:
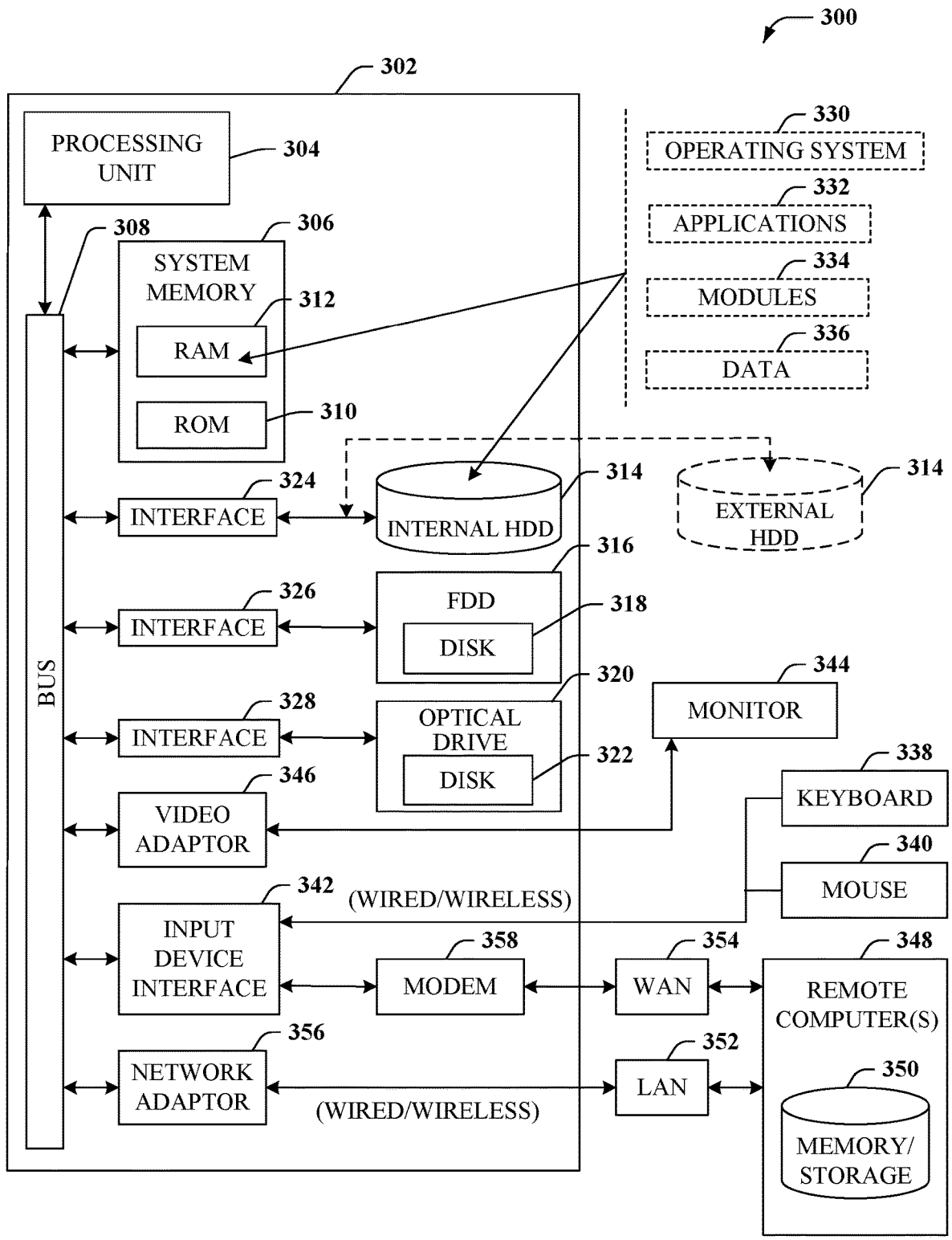
FIG. 3 is a block diagram of an example, non-limiting embodiment of a computing environment in accordance with various aspects described herein.

Turning now to FIG. 3, there is illustrated a block diagram of a computing environment in accordance with various aspects described herein. In order to provide additional context for various embodiments of the embodiments described herein, FIG. 3 and the following discussion are intended to provide a brief, general description of a suitable computing environment 300 in which the various embodiments of the subject disclosure can be implemented. In particular, the computing environment 300 can be used in a computing device described herein. Each of these devices can be implemented via computer-executable instructions that can run on one or more computers, and/or in combination with other program modules and/or as a combination of hardware and software. For example, computing environment 300 can facilitate in whole or in part safeguarding (e.g., digitally signing, verifying, and/or auditing) one or more inventory models.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 3, the example environment can comprise a computer 302, the computer 302 comprising a processing unit 304, a system memory 306 and a system bus 308. The system bus 308 couples system components including, but not limited to, the system memory 306 to the processing unit 304. The processing unit 304 can be any of various commercially available processors. Dual microprocessors and other multiprocessor architectures can also be employed as the processing unit 304.

The system bus 308 can be any of several types of bus structure that can further interconnect to a memory bus (with or without a memory controller), a peripheral bus, and a local bus using any of a variety of commercially available bus architectures. The system memory 306 comprises ROM 310 and RAM 312. A basic input/output system (BIOS) can be stored in a non-volatile memory such as ROM, erasable programmable read only memory (EPROM), EEPROM, which BIOS contains the basic routines that help to transfer information between elements within the computer 302, such as during startup. The RAM 312 can also comprise a high-speed RAM such as static RAM for caching data.

The computer 302 further comprises an internal hard disk drive (HDD) 314 (e.g., EIDE, SATA), which internal HDD 314 can also be configured for external use in a suitable chassis (not shown), a magnetic floppy disk drive (FDD) 316, (e.g., to read from or write to a removable diskette 318) and an optical disk drive 320, (e.g., reading a CD-ROM disk 322 or, to read from or write to other high-capacity optical media such as the DVD). The HDD 314, magnetic FDD 316 and optical disk drive 320 can be connected to the system bus 308 by a hard disk drive interface 324, a magnetic disk drive interface 326 and an optical drive interface 328, respectively. The hard disk drive interface 324 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 302, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 312, comprising an operating system 330, one or more application programs 332, other program modules 334 and program data 336. All or portions of the operating system, applications, modules, and/or data can also be cached in the RAM 312. The systems and methods described herein can be implemented utilizing various commercially available operating systems or combinations of operating systems.

A user can enter commands and information into the computer 302 through one or more wired/wireless input devices, e.g., a keyboard 338 and a pointing device, such as a mouse 340. Other input devices (not shown) can comprise a microphone, an infrared (IR) remote control, a joystick, a game pad, a stylus pen, touch screen or the like. These and other input devices are often connected to the processing unit 304 through an input device interface 342 that can be coupled to the system bus 308, but can be connected by other interfaces, such as a parallel port, an IEEE 1394 serial port, a game port, a universal serial bus (USB) port, an IR interface, etc.

A monitor 344 or other type of display device can be also connected to the system bus 308 via an interface, such as a video adapter 346. It will also be appreciated that in alternative embodiments, a monitor 344 can also be any display device (e.g., another computer having a display, a smart phone, a tablet computer, etc.) for receiving display information associated with computer 302 via any communication means, including via the Internet and cloud-based networks. In addition to the monitor 344, a computer typically comprises other peripheral output devices (not shown), such as speakers, printers, etc.

The computer 302 can operate in a networked environment using logical connections via wired and/or wireless communications to one or more remote computers, such as a remote computer(s) 348. The remote computer(s) 348 can be a workstation, a server computer, a router, a personal computer, portable computer, microprocessor-based entertainment appliance, a peer device or other common network node, and typically comprises many or all of the elements described relative to the computer 302, although, for purposes of brevity, only a remote memory/storage device 350 is illustrated. The logical connections depicted comprise wired/wireless connectivity to a local area network (LAN) 352 and/or larger networks, e.g., a wide area network (WAN) 354. Such LAN and WAN networking environments are commonplace in offices and companies, and facilitate enterprise-wide computer networks, such as intranets, all of which can connect to a global communications network, e.g., the Internet.

When used in a LAN networking environment, the computer 302 can be connected to the LAN 352 through a wired and/or wireless communication network interface or adapter 356. The adapter 356 can facilitate wired or wireless communication to the LAN 352, which can also comprise a wireless AP disposed thereon for communicating with the adapter 356.

When used in a WAN networking environment, the computer 302 can comprise a modem 358 or can be connected to a communications server on the WAN 354 or has other means for establishing communications over the WAN 354, such as by way of the Internet. The modem 358, which can be internal or external and a wired or wireless device, can be connected to the system bus 308 via the input device interface 342. In a networked environment, program modules depicted relative to the computer 302 or portions thereof, can be stored in the remote memory/storage device 350. It will be appreciated that the network connections shown are example and other means of establishing a communications link between the computers can be used.

The computer 302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 4:
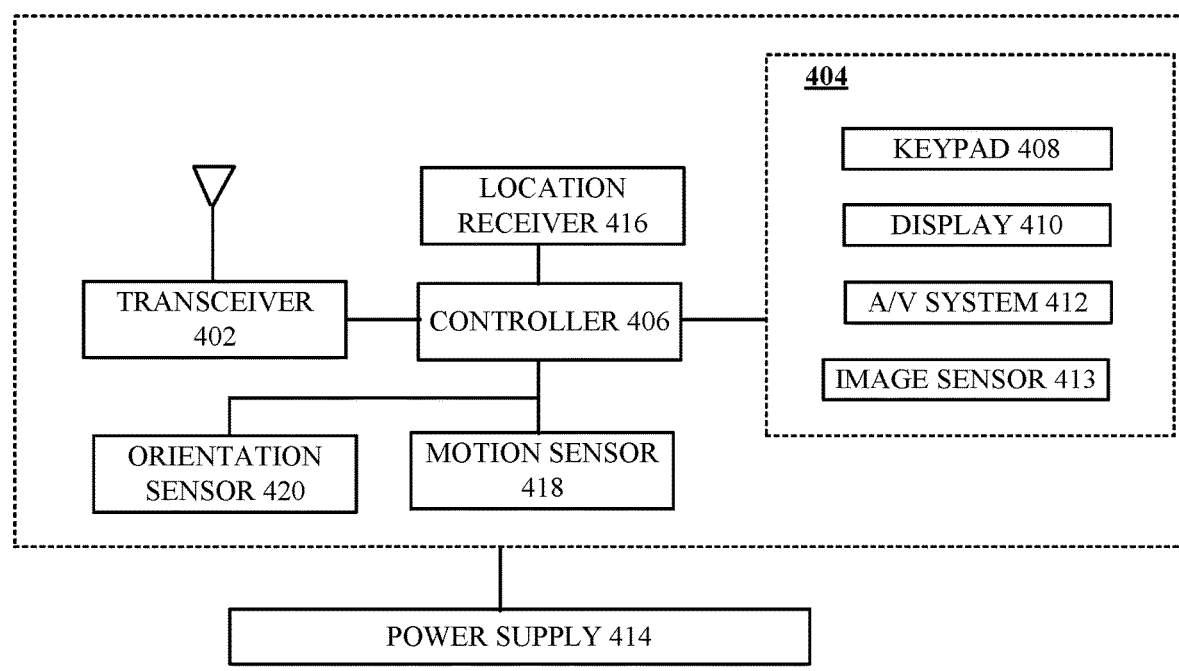
FIG. 4 is a block diagram of an example, non-limiting embodiment of a mobile network platform in accordance with various aspects described herein.

Turning now to FIG. 4, an illustrative embodiment of a communication device 400 is shown. Communication device 400 can facilitate in whole or in part safeguarding (e.g., digitally signing, verifying, and/or auditing) one or more inventory models.

The communication device 400 can comprise a wireline and/or wireless transceiver 402 (herein transceiver 402), a user interface (UI) 404, a power supply 414, a location receiver 416, a motion sensor 418, an orientation sensor 420, and a controller 406 for managing operations thereof. The transceiver 402 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 402 can also be adapted to support circuit-switched wireline access technologies (such as PSTN), packet-switched wireline access technologies (such as TCP/IP, VOIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth®. The keypad 408 can represent a numeric keypad commonly used by phones, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410 with navigation features.

The display 410 can use touch screen technology to also serve as a user interface for detecting user input. As a touch screen display, the communication device 400 can be adapted to present a user interface having graphical user interface (GUI) elements that can be selected by a user with a touch of a finger. The display 410 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 410 can be an integral part of the housing assembly of the communication device 400 or an independent device communicatively coupled thereto by a tethered wireline interface (such as a cable) or a wireless interface.

The UI 404 can also include an audio system 412 that utilizes audio technology for conveying low volume audio (such as audio heard in proximity of a human car) and high-volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and/or charging system technologies for supplying energy to the components of the communication device 400 to facilitate long-range or short-range portable communications. Alternatively, or in combination, the charging system can utilize external power sources such as DC power supplied over a physical interface such as a USB port or other suitable tethering technologies.

The location receiver 416 can utilize location technology such as a global positioning system (GPS) receiver capable of assisted GPS for identifying a location of the communication device 400 based on signals generated by a constellation of GPS satellites, which can be used for facilitating location services such as navigation. The motion sensor 418 can utilize motion sensing technology such as an accelerometer, a gyroscope, or other suitable motion sensing technology to detect motion of the communication device 400 in three-dimensional space. The orientation sensor 420 can utilize orientation sensing technology such as a magnetometer to detect the orientation of the communication device 400 (north, south, west, and east, as well as combined orientations in degrees, minutes, or other suitable orientation metrics).

The communication device 400 can use the transceiver 402 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 406 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 400.

Other components not shown in FIG. 4 can be used in one or more embodiments of the subject disclosure. For instance, the communication device 400 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically safeguarding (e.g., digitally signing, verifying, and/or auditing) one or more inventory models) can employ various AI-based schemes for carrying out various embodiments thereof. Moreover, a classifier can be employed to determine a ranking or priority of file(s), model(s), device(s), and/or relationship(s). A classifier is a function that maps an input attribute vector, $x=(x_1, x_2, x_3, x_4 \ldots x_n)$, to a confidence that the input belongs to a class, that is, $f(x)=confidence(class)$. Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the file(s), model(s), device(s), and/or relationship(s) is to receive priority.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A non-transitory machine-readable medium comprising executable instructions that, when executed by a processing system including a processor, facilitate performance of operations, the operations comprising:
   obtaining a first file comprising a first model describing a network;
   obtaining a second file that is cryptographically signed, the second file comprising a second model describing the network;
   based on a verification of a cryptographic signature in the second file in which content of the second model is extracted and used to verify the cryptographic signature, comparing the first model with the second model, wherein the comparing generates a comparison result; and
   responsive to the comparison result being that the second model is not identical to the first model, outputting a notification.

2. The non-transitory machine-readable medium of claim 1, wherein:
   the first model is a first metadata model;
   the second model is a second metadata model; and
   the network comprises a computer networking infrastructure.

3. The non-transitory machine-readable medium of claim 1, wherein each of the first model and the second model:
   identifies a respective plurality of components of the network;
   identifies a respective plurality of relationships among the components of the network; or
   any combination thereof.

4. The non-transitory machine-readable medium of claim 3, wherein:
   the respective plurality of components of the network that are identified by the first model and the second model are a same plurality of components; and
   the respective plurality of relationships among the components of the network that are identified by the first model and the second model are a same plurality of relationships.

5. The non-transitory machine-readable medium of claim 1, wherein each of the first model and the second model is described using JavaScript Object Notation (JSON).

6. The non-transitory machine-readable medium of claim 1, wherein the second file is cryptographically signed via use of a private key/public key mechanism.

7. The non-transitory machine-readable medium of claim 1, wherein:
the first file is obtained from a first source; and
the second file is obtained from a second source, wherein the second source is different from the first source.

8. The non-transitory machine-readable medium of claim 7, wherein:
the first source is accessible via the Internet; and
the second source is not accessible via the Internet.

9. The non-transitory machine-readable medium of claim 1, wherein:
the first model is a first metadata model;
the second model is a second metadata model; and
the operations further comprise:
comparing the first metadata model with the second metadata model, wherein the comparing of the first metadata model with the second metadata model generates the comparison result; and
responsive to the comparison result being that the second metadata model is not identical to the first metadata model, outputting the notification.

10. The non-transitory machine-readable medium of claim 1, wherein the notification identifies one or more differences between the first model and the second model.

11. A device, comprising:
a processing system including a processor; and
a memory that stores executable instructions that, when executed by the processing system, facilitate performance of operations, the operations comprising:
determining whether a file that is cryptographically signed and which contains a first instance of a metadata model describing a network has been modified subsequent to the file having been cryptographically signed, wherein the determining involves cryptographic signature verification based on extracted content of the first instance of the metadata model, resulting in a determination;
responsive to the determination being that the file has not been modified subsequent to the file having been cryptographically signed, comparing the first instance of the metadata model with a second instance of the metadata model, wherein the comparing generates a comparison result; and
responsive to the comparison result being that the first instance of the metadata model is not identical to the second instance of the metadata model, outputting a warning.

12. The device of claim 11, wherein the operations further comprise prior to the comparing (1) obtaining the file that is cryptographically signed, and (2) obtaining the second instance of the metadata model.

13. The device of claim 12, wherein the file that is cryptographically signed is obtained from a first source that is a different source than a second source from where the second instance of the metadata model is obtained.

14. The device of claim 11, wherein the warning is output to a user via email, SMS, text message, a display, or any combination thereof.

15. A method, comprising:
obtaining, by a processing system including a processor, a first file comprising a first model describing a network;
obtaining, by the processing system, a second file that is cryptographically signed, the second file comprising a second model describing the network;
based on a verification of a cryptographic signature in the second file in which content of the second model is extracted and used to verify the cryptographic signature, comparing, by the processing system, the first model with the second model, wherein the comparing generates a comparison result; and
responsive to the comparison result being that the second model is not identical to the first model, outputting, by the processing system, a notification.

16. The method of claim 15, wherein:
the first model is a first metadata model;
the second model is a second metadata model; and
the network comprises a computer networking infrastructure.

17. The method of claim 15, wherein each of the first model and the second model:
identify a respective plurality of components of the network;
identify a respective plurality of relationships among the components of the network; or
any combination thereof.

18. The method of claim 15, wherein each of the first model and the second model is described using JavaScript Object Notation (JSON), and wherein the second file is cryptographically signed via use of a private key/public key mechanism.

19. The method of claim 15, wherein:
the first file is obtained from a first source; and
the second file is obtained from a second source, wherein the second source is different from the first source.

20. The method of claim 15, wherein the notification identifies one or more differences between the first model and the second model.

* * * * *